United States Patent [19]

Asakura et al.

[11] 4,360,550
[45] Nov. 23, 1982

[54] COMPOSITE PACKING FILM AND PACKING BAG MADE OF THE SAME

[75] Inventors: Hiroshi Asakura, Oiso; Ippei Chimura, Yokohama; Teruaki Taguchi, Ebina; Renzo Minagawa, Koganei, all of Japan

[73] Assignee: Toyo Kagaku Kabushiki Kaisha, Kanagawa, Japan

[21] Appl. No.: 184,511

[22] Filed: Sep. 5, 1980

[30] Foreign Application Priority Data

Sep. 12, 1979 [JP] Japan .............................. 54-116059
Oct. 9, 1979 [JP] Japan .............................. 54-130428

[51] Int. Cl.³ .................... B32B 3/02; B32B 7/00; B32B 27/06; B32B 31/08
[52] U.S. Cl. ................................ 428/35; 428/215; 428/192; 428/458; 428/480; 428/474.4; 428/511; 428/520; 428/537; 428/910; 428/516
[58] Field of Search ............... 428/35, 215, 910, 192, 428/458, 516, 480, 474.4, 520, 511, 537

[56] References Cited

U.S. PATENT DOCUMENTS 3,322,613 5/1967 Rasmussen ........................... 428/910
4,085,244 4/1978 Stillman ........................... 428/910 X
4,276,347 6/1981 Shimada et al. ..................... 428/910

FOREIGN PATENT DOCUMENTS 51-25583 3/1976 Japan ................................ 428/910
1094480 12/1967 United Kingdom ................ 428/910

Primary Examiner—P. Ives
Attorney, Agent, or Firm—Jordan and Hamburg

[57] ABSTRACT

A composite packing film is provided which comprises a base film having relatively small longitudinal and transverse elongations of not more than 10%, a layer of unidirectionally elongated film elongated in one direction and laminated on one face of said base film through an adhesive, a layer of an elongated film elongated at least in the direction substantially perpendicular to said first direction and laminated on the other face of said base film through an adhesive, and a sealant layer having a melting point lower than those of said elongated films and laminated on either one of the external faces of said elongated films, the difference between the resistance against end tearing of said unidirectionally elongated film and the resistance against end tearing of said latter-mentioned elongated film being not less than 15 kg. A packing bag made of the composite film is also provided.

12 Claims, 2 Drawing Figures

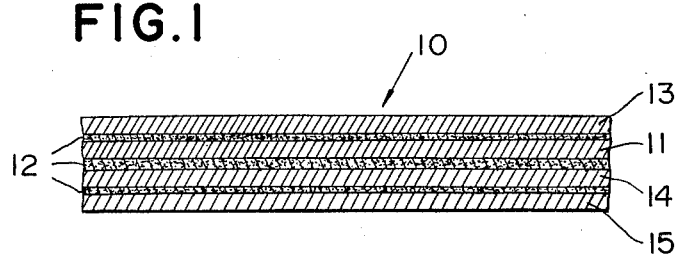
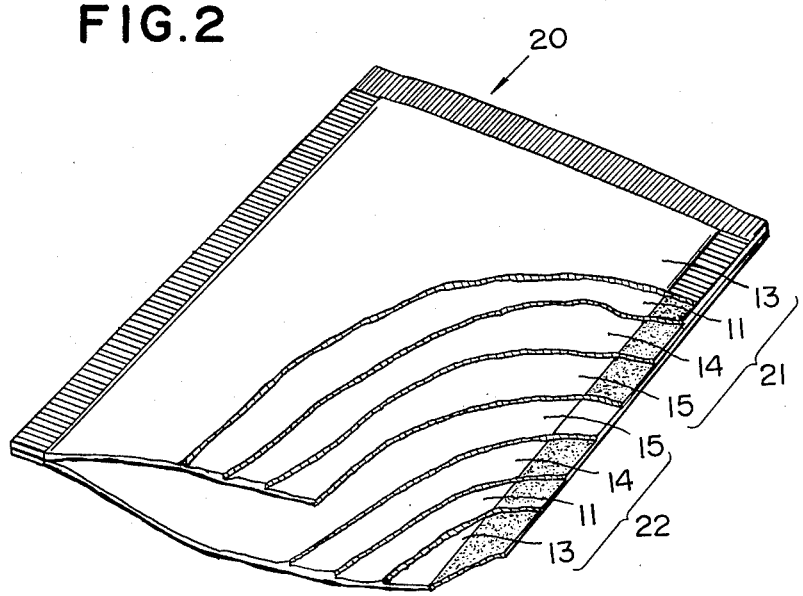

COMPOSITE PACKING FILM AND PACKING BAG MADE OF THE SAME

BACKGROUND OF THE INVENTION

1. Field of the Invention

The present invention relates to a composite packing film and a packing bag or pouch made of the composite packing film, and particularly to a composite packing film suited for packing relatively heavy materials including foodstuffs and medicines, such as soft drinks, seasonings, flavorings and chemicals.

2. Prior Art

A variety of composite packing or wrapping films have been proposed in recent years to meet different requirements for packing or wrapping goods having various properties, and the development of such composite packing or wrapping films has contributed to improvements in the field of package technology. However, the endeavours hitherto expended for the development of composite films have been directed primarily to the improvement in package making technique, such as improvement in processing of the packages or sealing property of the film, and to the improvement in preservation of the qualities of the goods which are packed by the composite films. As a result, only a few efforts have been made to investigate the tearing property and the orientation of the cut line when the bag or pouch is opened. Subsequently, the conventional composite packing or wrapping films are unsatisfactory in this respect.

As has been well known, the packing bags made of composite films are generally handled and processed by automatic machines, and the tearing property and the orientation of cut line of the bags at the opening operation tend to be ignored or neglected. However, the bags are generally opened by the hands of the consumers to gain access to the goods contained therein. In consideration of the convenience for the consumers, it is highly desirous that the film be easily torn. Particularly when the film is used to form a pouch for packing food stuffs, medicines or the like materials, it is of significant importance that the film be easily torn to open the pouch individually by the fingers of the consumers. In addition to the tearing property as aforementioned, it is also desirous that the packing pouch or bag can be torn or cut linearly along a predetermined direction. In the case where a liquid, powdered or granular material is contained in the pouch or bag, if the cut line is not determined and the pouch or bag is occasionally torn diagonally or in a zigzag form, there is a fear that the contained material will be spilled or run out and expending of care is thus necessitated to open the pouch or bag made of the conventional composite films.

In order to overcome the aforementioned disadvantage of the pouch or bag made of the conventional composite film, we have proposed composite films and packages made of the same by Japanese patent application No. 88936/1978 (Japanese Patent Provisional Publication No. 15839/1980) and Japanese patent application No. 17803/1979. However, although the composite films of this type, wherein the tearing property mainly depends on the orientation of molecules in the unidirectionally elongated film, have sufficient strength along the elongated direction, the strength thereof along the direction transverse to the elongated direction is not satisfactory and cannot be used for packing relatively heavy materials.

OBJECTS AND SUMMARY OF THE INVENTION

A primary object of the present invention is to provide a composite packing film which has satisfactory strength both along the longitudinal and transverse directions and yet can be easily torn along a pre-selected direction by one's hand or hands, the tearing direction being pre-selected from the longitudinal and transverse directions, and to provide a package bag or pouch made of such film.

Another object of the present invention is to provide a composite packing film and a package bag or pouch made of the same which may be torn along a linear cut line.

A further object of the present invention is to provide a composite packing film and a package bag or pouch suited for sealingly packing a relatively heavy material.

A still further object of the invention is to provide a composite packing film from which a package bag or pouch can be formed through a simple manufacturing process.

The above and other objects of the present invention will become apparent from the following description.

According to the present invention, there is provided a composite packing film comprising a base film having relatively small longitudinal and transverse elongations of not more than 10%, a layer of unidirectionally elongated film elongated in one direction and laminated on one face of said base film through an adhesive, a layer of an elongated film elongated at least in the direction substantially perpendicular to said one direction and laminated on the other face of said base film through an adhesive, and a sealant layer having a melting point lower than those of said elongated films and laminated on either one of the external faces of said elongated films, the difference between the resistance against end tearing of said unidirectionally elongated film and the resistance against end tearing of said latter-mentioned elongated film being not less than 15 kg.

According to another aspect of the present invention, there is provided a bag or pouch made of the composite packing film as described above, wherein two of said composite packing films are superposed on one another so that the inside faces of the bag are formed by said sealant layers extending in face-to-face relationship and welded together along the edge portions and that the direction to be torn of said one of the composite packing films is coincident with that of the other composite packing film.

BRIEF DESCRIPTION OF THE DRAWINGS

FIG. 1 is a schematic sectional view of an embodiment of the composite packing film of the invention showing the laminated order of the layers.

FIG. 2 is a perspective view, partly broken away, showing schematically a package bag made of the composite film shown in FIG. 1.

PREFERRED EMBODIMENTS OF THE INVENTION

Preferred embodiments of the invention will now be described with reference to the appended drawings.

Initially referring to FIG. 1, an embodiment of the composite packing film of the invention is shown generally at 10. The composite film 10 includes a base film 11 having relatively small longitudinal and transverse elongations of not more than 10%. A unidirectionally elongated film 13 elongated along either longitudinal or transverse direction is laminated on the one face of the base film 11 through an adhesive layer 12, and an elongated film 14 elongated at least along the direction substantially perpendicular to the elongation direction of the film 13 is laminated on the other face of the base film 11 through an adhesive layer 12. Specifically, if the unidirectionally elongated film 13 is a longitudinally elongated film, a transversely elongated film or a film elongated in crosswise dual directions may be used as the elongated film 14, whereas if the unidirectionally elongated film 13 is a transversely elongated film, a longitudinally elongated film or a film elongated in crosswise dual directions may be used as the elongated film 14.

One important feature of the present invention resides in that the unidirectionally elongated film 13 and the elongated film 14 are overlaid with each other such that the elongation direction or directions of the latter mentioned film 14 includes the direction substantially perpendicular to the elongation direction of the unidirectionally elongated film 13. As a result, the composite film 10 has sufficient strengths both in longitudinal and transverse directions and a bag made of the same can hold a relatively heavy content. Another important feature of the present invention resides in that a base film 11 having relatively small longitudinal and transverse elongations of not more than 10% is interposed between the unidirectionally elongated film 13 and the elongated film 14. By the provision of the interposed film 11, the composite film 10 is prevented from being stretched in its entirety when the composite film 10 is subjected to tearing action. Subsequently, by the resistant action of the base film 11, the fluctuation of the tearing direction or cut line is suppressed and the cut line is stabilized. A bag made of the composite film of the invention may be easily opened by consumer's hand or hands along a pre-set linear cut line without the necessity of being annoyed to prevent the content from spilling out of the bag.

The elongation of the base film 11 shall be not more than 10%, since the stretching of the entire composite film 10 at the tearing or opening operation cannot be adequately suppressed if the elongation of the base film 11 exceeds 10%.

A further important feature of the present invention resides in that the difference in resistance against end tearing (determined in accordance with the JIS C-2317 Method) between the unidirectionally elongated film 13 and the elongated film 14 shall be not less than 15 kg. If the difference in resistance against end tearing is less than 15 kg, it becomes difficult to tear or cut the film along a pre-set linear direction by hands. Also, it is preferred that the difference between the thickness of the unidirectionally elongated film 13 and that of the elongated film 14 may be 5 microns or more, since the tearing property along the elongated direction of the thicker film may be further improved.

Materials used for the base film 11 having relatively small longitudinal and transverse elongations of not more than 10% include paper and aluminum foil. When paper is used, it is desirous that the thickness thereof be in the range of from 30 to 118 g/m², preferably from 40 to 90 g/m². If the thickness is less than 30 g/m², there may be some cases where the entire composite film 10 cannot be prevented from stretching due to deficiency in thickness occasionally leading to fluctuation of the tearing direction so that the stability or steadiness of the cut line is adversely affected. On the contrary, if the thickness exceeds 118 g/m², the composite film 10 becomes too strong to impede easy tearing. For the similar reasons, it is desirous that the thickness be in the range of from 6 to 50 microns, preferably from 7 to 30 microns, when an aluminum foil is used as the base film 11.

Preferably, the longitudinally elongated film which may be used as the unidirectionally elongated film 13 or the elongated film 14 in the present invention may be made of a high density polyethylene having a density of not less than 0.94 g/cc and elongated four to ten times in the longitudinal direction, and may have a thickness of from 10 to 100 microns. On the other hand, the transversely elongated film which may be used as the unidirectionally elongated film 13 or the elongated film 14 in the present invention may be made of a high density polyethylene having a density of not less than 0.94 g/cc and elongated not more than two times in the longitudinal direction and six to sixteen times in the transverse direction, and preferably may have a thickness of from 10 to 50 microns. Throughout the specification and claims, the term "longitudinally elongated film" is used to mean the film elongated in the lengthwise direction of the web of continuous film prior to be wound around a take-up reel at the production step thereof, whereas the term "transversely elongated film" means the film elongated in the direction perpendicular to said lengthwise direction at the production step thereof. It is also noted that "longitudinally or a longitudinal direction" and "transversely or a transverse direction" herein referred to should be interpreted in similar senses. In the production of the longitudinally elongated film, the film is drafted at a temperature higher than the secondary transition point and then elongated at a temperature lower than the secondary transition point. Since the high polymer molecules are oriented lengthwise at the drafting step, the preferable magnification of elongation along the longitudinal direction ranges within four to ten times. On the other hand, in the production of the transversely elongated film, the film is preferably elongated in the transverse direction by a magnification of elongation ranging from six to sixteen times and also in the longitudinal direction by a magnification of elongation of not more than two times, since the film is directly elongated at a temperature lower than the secondary transition point without being subjected to preliminary drafting step.

The resistance against end tearing of the longitudinally elongated film having the lower limit elongation may be controlled to be substantially equal to that of the transversely elongated film having the lower limit elongation by selectively varying the thicknesses thereof. Similarly, the resistance against end tearing of the longitudinally elongated film having the upper limit elongation may be controlled to be substantially equal to that of the transversely elongated film having the upper limit elongation by selectively varying the thicknesses thereof. If the magnification of elongation is less than the above-defined range, the molecules in the film may not be oriented adequately to result in that the required strength cannot be obtained sometimes and a linear cut line may not be formed when it is torn. On the contrary, if the magnification of elongation exceeds the upper limitation, a problem may arise at the manufacturing operation to make it substantially impossible to produce the film. If the thickness of the longitudinally and transversely elongated films are less than the values respectively defined as above, it may become impossible to determine the orientation of cut line due to deficiency in thickness. On the contrary, if the thicknesses exceed the values as defined above, difficulty may be encountered in tearing the film by hands. For the aforementioned reasons, it is preferred that the longitudinally and transversely elongated films have the magnifications of elongation and the thicknesses as described above.

In the case where a film elongated in crosswise dual directions is used as the elongated film 14, it is desirous that the magnifications of elongation in the longitudinal and transverse directions be in the range of from two to seven times, and the thickness be from 10 to 100 microns, preferably 10 to 50 microns. If the thickness is less than 10 microns, there is a possibility that the required strength cannot be obtained due to the lack of thickness. On the contrary, if the thickness of the film exceeds 100 microns, it may become difficult to tear the film by hands. Films made of polyesters, polypropylene, polyamides and polyvinylalcohol may be used as the film elongated in crosswise dual directions.

A sealant layer 15 is further laminated on the elongated film 14 through an adhesive layer 12. Although the sealant layer 15 is laminated on the elongated film 14 in the embodiment shown in FIG. 1, the sealant layer 15 may be laid on the unidirectionally elongated film 13. The sealant layer 15 is made of a material which has a melting point lower than those of the elongated films 13 and 14. This is because the elongated films 13 and 14 shall not be deformed by heating at the hot melt step for adhering to seal the peripheral edges of the opposing sealant layers 15 to form a bag 20 as shown in FIG. 2. The sealant layer 15 serves not only to sealingly preserve the content in the bag 20 but also as a hot melt type adhesive in the production of the bag 20. Although the sealant layer 15 is laminated on the elongated film 14 by the use of an adhesive 12 in the embodiment shown in FIG. 1, the layer 15 may be directly applied on the film 14 by means of hot melting without using any adhesive.

It is desirous that the thickness of the sealant layer 15 be 10 to 150 microns, preferably 15 to 120 microns. If the thickness of the sealant layer is less than 10 microns, there is a fear that the sealing effect becomes unsatisfactory. On the contrary, even if the thickness is increased to exceed 150 microns, the sealing effect cannot be improved any more. It is preferred that the sealant layer 15 is made of a low density polyethylene having a density of not more than 0.92 g/cc, an ethylene-vinyl acetate copolymer or an ionomer resin.

In order to make the packing bag 20 as shown in FIG. 2, the composite films 21 and 22 shall be laid over one another such that the directions to be torn of respective composite films 21 and 22 are coincident with each other. By the use of the composite film according to the present invention having a sealant layer 15 applied either one of the elongated films 13 or 14, a bag 20 may be formed by simply hot melting the opposing sealant layers 15 by means of an automatic packaging machine. Thus, the composite film of the invention may be advantageously used as a package material well suited for mass production wherein an automatic packaging machine is used.

EXAMPLES OF THE INVENTION

Examples of the present invention will now be described hereinbelow. However, it is to be noted here that the present invention shall not be limited only to the examples given below.

In the following examples, the hand cut property shows the easiness in tearing the composite film by fingers and the marks appearing in the Tables have the following meanings:

O: can be torn easily
Δ: can be torn only by scratching with nails
×: cannot be torn by fingers The orientation of the cut line is determined by forming a notch of 3 mm extending crosswise from the edge of the film followed by tearing from the notched portion at a tearing speed of 30 m/min, and the marks appearing in the Tables have the following meanings:

O: To be torn along a substantially linear cut line
×: Substantially linear cut line is not formed.

The Elemendorf tearing strength is determined in accordance with the JIS P-8116 Method, and the resistance against end tearing is determined in accordance with the JIS C-2317 Method.

EXAMPLE 1

Each of the composite films shown in Tables 1 and 2 consists of a 7 micron thick aluminum foil having a longitudinal elongation of 4.3% and a transverse elongation of 4.8%, a high density polyethylene film each having the thickness as set forth in the Tables elongated seven times in the longitudinal direction and laminated on one face of the aluminum foil, a high density polyethylene film each having the thickness as set forth in the Tables elongated twelve times in the transverse direction and laminated on the other face of the aluminum foil, the first mentioned longitudinally elongated film and the second mentioned transversely elongation film being laid such that the elongated directions of them cross with each other, and a 30 micron thick sealant layer made of a low density polyethylene laminated on the face of the second mentioned transversely elongated film other than the face adhering to the aluminum foil. As will be seen from Tables 1 and 2, using the longitudinally elongated film and the transversely elongated film which are different in tearing strength, the composite film has an improved tearing property by the influence of the final elongation due to difference in tearing strength between both films, and the composite film can be torn linearly along the direction determined by the film having the higher tearing strength.

As will be clearly seen from Run Nos. 4 to 6 and 14 to 16, when the difference in resistance to end tearing is zero, the composite film cannot be easily torn by hands and the cut is not linear. As will be clearly seen from Run No. 9, when the difference in resistance against end tearing reaches 15 kg and the thicknesses of the films are within certain ranges, it becomes necessary to tear the composite film by scratching with nails. As shown by Run Nos. 10 and 22, when the difference in resistance against end tearing is less than 15 kg, the composite film cannot be torn by hands.

TABLE 1

| Run No. | Thickness of Elongated Film (μ) Longitudinally Elongated Film | Thickness of Elongated Film (μ) Transversely Elongated Film | Orientation of Tearing | Elemendorf Tearing Strength (g) Longitudinal | Elemendorf Tearing Strength (g) Transverse | Resistance against End Tearing (kg) Longitudinal | Resistance against End Tearing (kg) Transverse | Hand Cut Property | Orientation of Cut Line |
|---|---|---|---|---|---|---|---|---|---|
| 1 | 25 | 10 | Longitudinal | 30 | — | 2.0 | 25.0 | O | O |
| 2 | 25 | 15 | Longitudinal | 80 | — | 2.5 | 25.0 | O | O |
| 3 | 25 | 20 | Longitudinal | 150 | — | 7.0 | 25.0 | O | O |
| 4 | 25 | 23 | Longitudinal | — | — | 25.0 | 25.0 | × | × |
| 5 | 25 | 25 | Longitudinal | — | — | 25.0 | 25.0 | × | × |
| 6 | 25 | 28 | Longitudinal | — | — | 25.0 | 25.0 | × | × |
| 7 | 25 | 30 | Transverse | — | 200 | 25.0 | 8.0 | O | O |
| 8 | 25 | 40 | Transverse | — | 200 | 25.0 | 8.0 | O | O |
| 9 | 25 | 50 | Transverse | — | 300 | 25.0 | 10.0 | Δ | O |
| 10 | 25 | 70 | Transverse | — | 800 | 25.0 | 20.0 | × | O |

TABLE 2

| Run No. | Thickness of Elongated Film (μ) Longitudinally Elongated Film | Thickness of Elongated Film (μ) Transversely Elongated Film | Orientation of Tearing | Elemendorf Tearing Strength (g) Longitudinal | Elemendorf Tearing Strength (g) Transverse | Resistance against End Tearing (kg) Longitudinal | Resistance against End Tearing (kg) Transverse | Hand Cut Property | Orientation of Cut Line |
|---|---|---|---|---|---|---|---|---|---|
| 11 | 10 | 30 | Transverse | — | 20 | 25.0 | 2.0 | O | O |
| 12 | 20 | 30 | Transverse | — | 100 | 25.0 | 5.0 | O | O |
| 13 | 25 | 30 | Transverse | — | 200 | 25.0 | 8.0 | O | O |
| 14 | 28 | 30 | Transverse | — | — | 25.0 | 25.0 | × | × |
| 15 | 30 | 30 | Transverse | — | — | 25.0 | 25.0 | × | × |
| 16 | 33 | 30 | Transverse | — | — | 25.0 | 25.0 | × | × |
| 17 | 35 | 30 | Longitudinal | 300 | — | 8.0 | 25.0 | O | O |
| 18 | 40 | 30 | Longitudinal | 200 | — | 4.0 | 25.0 | O | O |
| 19 | 50 | 30 | Longitudinal | 200 | — | 6.0 | 25.0 | O | O |
| 20 | 70 | 30 | Longitudinal | 300 | — | 8.0 | 25.0 | O | O |
| 21 | 90 | 30 | Longitudinal | 800 | — | 10.0 | 25.0 | O | O |
| 22 | 110 | 30 | Longitudinal | 1600 | — | 15.0 | 25.0 | × | O |

EXAMPLE 2

Experiments were conducted to learn the influence of the base film hinterposed between the longitudinally elongated film and the transversely elongated film on the tearing property and the orientation of the cut line of the resultant composite film. Each of the base films having the elongations as set forth in Table 3 was sandwiched between a 45 micron thick high density polyethylene film elongated seven times in the longitudinal direction and a 30 micron thick high density polyethylene film elongated twelve times in the transverse direction, the first mentioned longitudinally elongated film and the second mentioned transversely elongated film being laid such that the elongation directions of them cross with each other, and a sealant layer made of a 30 micron thick low density polyethylene was laminated. As will be clearly seen from the results shown in Table 3, the composite film (Run No. 23) having no interposed base film having a relatively small elongation is unsatisfactory both in the hand cut property and in the orientation of cut line. On the other hand, the composite film (Run No. 26) having an interposed base film having too large an elongation is also unsatisfactory in that it cannot be cut or torn linearly and has a problem in hand cut property.

TABLE 3

| Run No. | Base Film | Elongation (%) Longitudinal | Elongation (%) Transverse | Hand Cut Property | Orientation of Cut Line |
|---|---|---|---|---|---|
| 23 | None | — | — | × | × |
| 24 | Aluminum Foil | 4.3 | 4.8 | O | O |
| 25 | Paper | 2.4 | 5.5 | O | O |
| 26 | Sheet Polyethylene Film | 150 | 50 | × | × |

EXAMPLE 3

A composite film was formed by laminating a 20 micron thick dual-directionally elongated polyethylene film elongated five times in the longitudinal direction and seven times in the transverse direction on one face of a 7 micron thick aluminum foil having a longitudinal elongation of 2.4% and a transverse elongation of 5.5%, laminating a 20 micron thick transversely elongated polyethylene film elongated twelve times in the transverse direction on the other face of the aluminum foil, and laminating a sealant layer made of a 30 micron thick low density polyethylene on the other face of said transversely elongated polyethylene film. The thus formed composite film had an Elemendorf tearing strength in the transverse direction of 150 grams, a resistance against end tearing in the longitudinal direction of 25.0 kg and a resistance against end tearing in the transverse direction of 10.0 kg. The film could be easily torn by fingers to give a substantially linear cut line. Accordingly, it may be said that it has an improved hand cut property and it is satisfactory in its orientation of cut line.

Two sheets of the thus obtained film were overlaid such that the sealant layers were disposed in the face-toface relationship, and the periperal edge portions of the films were fused together by hot melting to form a bag. The thus formed bag had also an improved hand cut property and satisfactory orientation of the cut line.

EXAMPLE 4

A composite film was formed by laminating a 12 micron thick dual-directionally elongated polyester film elongated three times in the longitudinal direction and three times in the transverse direction on one face of a 7 micron thick aluminum foil having a longitudinal elongation of 2.4% and a transverse elongation of 5.5%, laminating a 25 micron thick longitudinally elongated polyethylene film elongated seven times in the longitudinal direction on the other face of the aluminum foil, and laminating a sealant layer made of a 30 micron thick low density polyethylene film on the other face of said longitudinally elongated polyethylene film. The thus formed composite film had an Elemendorf tearing strength in the transverse direction of 120 grams, a resistance against end tearing in the longitudinal direction of 25.0 kg and a resistance against end tearing in the transverse direction of 8.0 kg. The film could be easily torn by fingers to give a substantially linear cut line. Accordingly it may be said that it has an improved hand cut property and it is satisfactory in its orientation of cut line.

Two sheets of the thus obtained film were overlaid such that the sealant layers were disposed in the face-to-face relationship, and the peripheral edge portions of the films were fused together by hot melting to form a bag. The thus formed bag had also an improved hand cut property and satisfactory orientation of cut line.

COMPARATIVE EXAMPLE 1

A composite film was formed by laminating a 20 micron thick high density polyethylene film elongated eight times in the longitudinal direction on one face of a 9 micron thick aluminum foil having a longitudinal elongation of 4.9% and a transverse elongation of 5.1%, laminating a 20 micron thick high density polyethylene film elongated five times in the transverse direction on the other face of the aluminum foil, the first mentioned longitudinally elongated film and the second mentioned transversely elongated film being laid such that the elongated directions of them cross with each other, and laminating a sealant layer made of a 30 micron thick low density polyethylene film. The thus formed composite film has a resistance against end tearing in the longitudinal direction of 25.0 kg and a resistance against end tearing in the transverse direction of 25.0 kg. The film was unsatisfactory in hand cut property and also in orientation of cut line in that the film could not be torn by fingers and did not give a linear cut line.

COMPARATIVE EXAMPLE 2

A composite film was formed by laminating a 30 micron thick high density polyethylene film elongated three times in the longitudinal direction on one face of a 9 micron thick aluminum foil having a longitudinal elongation of 4.9% and a transverse elongation of 5.1% laminating a 20 micron thick high density polyethylene film elongated twelve times in the transverse direction, the first mentioned longitudinally elongated film and the second mentioned transversely elongated film being laid such that the elongation directions of them cross with each other, and laminating a sealant layer made of a 30 micron thick low density polyethylene film. The thus formed composite film has a resistance against end tearing in the longitudinal direction of 25.0 kg and a resistance against end tearing in the transverse direction of 25.0 kg. The film was unsatisfactory in hand cut property and also in orientation of cut line in that the film could not be torn by fingers and did not give a linear cut line.

Although the present invention has been described with reference to the specific embodiments, it is by no means intended that the present invention be limited but any modifications may be made without departing from the spirit of the invention.

What is claimed is:

1. A composite packing film, comprising a base aluminum foil or paper film having longitudinal and transverse elongations of not more than 10%,
    a layer of film elongated in one direction and laminated on one face of said base film through an adhesive,
    a layer of film elongated at least in a direction substantially perpendicular to the direction of elongation of said first elongated film, said second elongated film laminated to said base film on the side opposite said first elongated film, said first and second elongated films selected from the group consisting of high density polyethylene, polyesters, polypropylene, polyamides, polyvinyl alcohol, and mixtures thereof, and
    a layer of sealant having a melting point lower than the melting points of said first and second elongated films, laminated on at least one of said first and second elongated films on the side opposite said base film, said sealant selected from the group consisting of low density polyethylenes, ethylenevinyl acetate copolymers, ionomer resins, and mixtures thereof,
    characterized in that the difference between resistance against end tearing of said first elongated film and said second elongated film is at least about 15 kg, and the difference in thickness between the first elongated film and the second elongated film is at least about five microns.

2. A composite packing film as claimed in claim 1, wherein said base film is made of paper having a thickness ranging within 30 to 118 g/m$^2$.

3. A composite packing film as claimed in claim 1 wherein said base film is made of an aluminum foil having a thickness from 6 to 50 microns.

4. A composite packing film as claimed in claim 1, wherein said first elongated film is a longitudinally elongated film and said second elongated film is a transversely elongated film.

5. A composite packing film as claimed in claim 4, wherein said longitudinally elongated film is made of a high density polyethylene having a density of not less than 0.94 g/cc and a thickness of from 10 to 100 microns and elongated four to ten times only in the longitudinal direction, and the transversely elongated film is made of a high density polyethylene having a density of not less than 0.94 g/cc and a thickness of from 10 to 50 microns and elongated not more than two times in the longitudinal direction and six to sixteen times in the direction transverse to said longitudinal direction.

6. A composite packing film as claimed in claim 1, wherein said first elongated film is selected from the group consisting of a longitudinally elongated film and a transversely elongated film, and the second elongated film is elongated in two perpendicular directions.

7. A composite packing film as claimed in claim 6, wherein said longitudinally elongated film is made of a high density polyethylene having a density of not less than 0.94 g/cc and a thickness of from 10 to 100 microns and elongated four to ten times only in the longitudinal direction.

8. A composite packing film as claimed in claim 6, wherein said transversely elongated film is made of a high density polyethylene having a density of not less than 0.94 g/cc and a thickness of from 10 to 50 microns and elongated not more than two times in the longitudinal direction and six to sixteen times in the direction transverse to said longitudinal direction.

9. A composite packing film as claimed in claim 6, wherein said film elongated in two perpendicular directions is elongated two to seven times in the longitudinal direction and also elongated two to seven times in the direction transverse to said longitudinal direction and has a thickness of from 10 to 100 microns.

10. A composite packing film as claimed in claim 1, wherein said sealant layer has a thickness of from 10 to 150 microns.

11. A composite packing film as claimed in claim 1, wherein said sealant layer is made of low density polyethylenes having densities of not more than 0.92 g/cc.

12. An article constructed of composite packing film as set forth in claim 1, in which two of said composite packing films are superimposed on one another along the layer of sealant, with the tearing directions of both packing films coincident.

* * * * *